United States Patent [19]
Wittwer et al.

[11] Patent Number: 4,756,204
[45] Date of Patent: Jul. 12, 1988

[54] COUNTERBALANCE ASSEMBLY FOR ROTATABLE ROBOTIC ARM AND THE LIKE

[75] Inventors: Christoph F. Wittwer; David E. Suica, both of Cincinnati, Ohio

[73] Assignee: Cincinnati Milacron Inc., Cincinnati, Ohio

[21] Appl. No.: 13,351

[22] Filed: Feb. 11, 1987

[51] Int. Cl.$^4$ .................... B23J 18/00; B66C 23/72
[52] U.S. Cl. .................... 74/469; 16/1 C; 74/109; 74/592; 248/292.1; 267/72; 267/150; 901/48
[58] Field of Search .............. 74/109, 469, 592; 16/1 C; 248/292.1; 267/72, 150; 901/48

[56] References Cited
U.S. PATENT DOCUMENTS

| | | | |
|---|---|---|---|
| 2,402,400 | 6/1946 | Hewitt et al. | 267/150 X |
| 2,547,532 | 4/1951 | Mendelsohn | 248/292.1 |
| 3,031,090 | 4/1962 | Stephenson | 214/1 |
| 3,128,887 | 4/1964 | Guennec et al. | 214/1 |
| 3,153,286 | 10/1964 | Buisson | 74/109 X |
| 3,198,301 | 8/1965 | Randall | 74/582 X |
| 3,391,804 | 6/1968 | Flatau | 214/1 |
| 3,930,345 | 1/1976 | Kurzenberger | 267/70 X |
| 4,140,226 | 2/1979 | Richter | 214/1 |
| 4,277,044 | 7/1981 | Hamilton | 901/48 X |
| 4,297,908 | 11/1981 | Zimmer | 901/48 X |
| 4,500,251 | 2/1985 | Kiryu et al. | 414/719 |
| 4,507,043 | 3/1985 | Flatau | 414/719 |
| 4,546,233 | 10/1985 | Yasuoka | 901/48 X |

FOREIGN PATENT DOCUMENTS

| | | | |
|---|---|---|---|
| 228484 | 10/1985 | Fed. Rep. of Germany | 901/48 |
| 229952 | 11/1985 | Fed. Rep. of Germany | 901/48 |
| 1297285 | 5/1962 | France | 74/109 |
| 56-63149 | 5/1981 | Japan | 267/150 |

OTHER PUBLICATIONS

Advertising Brochure, "T$^3$646 Industrial Robot" Cincinnati Milacron, Publication No. A-399, 1986.

Primary Examiner—Allan D. Herrmann
Attorney, Agent, or Firm—Thomas M. Farrell

[57] ABSTRACT

A counterbalance assembly for use with a rotatable arm in a robotic manipulator, wherein such arm is rotated about a rotation axis. The assembly further includes one or more compression springs for providing resistance to compressive forces, and converting apparatus for translating the rotational movement of the rotatable arm about the rotation axis into linear deflection of such compression spring, whereby resistance of the compression spring to linear deflection in either direction along its longitudinal axis establishes an effective counterbalancing force which reduces the load bearing on the arm drive regardless of the direction in which the rotatable arm is rotated.

17 Claims, 4 Drawing Sheets

COUNTERBALANCE ASSEMBLY FOR ROTATABLE ROBOTIC ARM AND THE LIKE

TECHNICAL FIELD

This invention relates to a counterbalance assembly for use with a rotatable arm or the like in a robotic manipulator, and, more particularly, to a counterbalance assembly for use with a robotic manipulator arm which is rotated about a rotation axis by a torque producing means, and wherein the counterbalance assembly comprises a compression spring means for providing resistance to compressive forces.

BACKGROUND ART

It is commonly understood that in situations where a rotatable arm of a robotic manipulator, or similar rotated lever mechanism, is rotated in a particular direction about an axis and held in place at such rotated position, a torque load must be imposed at the axis of rotation in the direction opposite to the rotation movement of such arm or mechanism in order to hold the arm in such position. In particular, when a cantilevered robotic arm is rotated about an axis, a certain amount of rotational torque is required to maintain such robotic arm in rotated position (e.g. at a particular angle relative to the vertical or horizontal). If the robotic arm is relatively heavy, extends a substantial distance from the axis of rotation, and/or carries a payload at its distal end, the torque force required to maintain such arm in rotated position can be quite substantial. In this regard, circumstances may dictate the use of a much larger rotating motor or torque producing device simply to compensate for the substantial loads bearing on the rotation axis in use. Numerous attempts in the industry to use hydraulic or pneumatic devices to reduce the load bearing on the driving motors of various rotatable robotic arms have generally required undesirably large and complicated devices. As robotic manipulators are often used in manufacturing applications where working space is at a premium, cumbersome devices impose critical drawbacks. Moreover, added complexity not only adds to the cost of the robotic manipulator, but further adds to the cost of maintenance thereof.

A robotic arm having a bearing support designed to overcome the size and complexity problems described above is shown in U.S. Pat. No. 4,546,233, which issued to H. Yasuoka on Oct. 8, 1985. In particular, the Yasuoka patent discloses a robot arm having a bearing support comprising a tension spring provided between a tiltable upper arm and a stationary robot base. The upper arm is supported tiltably on top of a rotatary table which is mounted on the stationary table. A tension spring has one end fastened to the lower end of the tiltable upper arm, and its other end supported rotatably on the stationary table. Such tension spring is, therefore, tiltable and rotatable to correspond with the tilting and rotation of the upper arm, such that the spring remains in proper position to provide spring tension urging the lower end of the upper arm in the opposite direction of the direction in which the arm has been tilted. In this manner, the Yasuoka bearing support reduces the load bearing on the motor for tilting the upper arm without requiring large and complicated hydraulic or pneumatic load reducing devices. However, as can be seen from a review of the Yasuoka reference, the tension spring device itself requires a relatively substantial area within the center of the robotic device. It is often required (or at least desired) to route power lines and/or product supply lines (as appropriate) through the center of a robotic device for safety reasons and to minimize the space requirements of a robot. The rotating tension spring device shown in Yasuoka would make such use of the central portions of the robot difficult, if not impossible. Additionally, tension springs have a relatively short useful life and can fail catastrophically. A similar counterbalancing arrangement for a manipulator device is shown in U.S. Pat. No. 4,500,251, which issued to Y. Kiryu et al. on Feb 19, 1985.

Manipulator counterbalance arrangements relying on counterbalancing weight devices are shown in U.S. Pat. Nos. 3,031,090 (Stephenson); 3,128,887 (Guennec et al.); and 4,507,043 (Flatau). These structures, however, require relatively substantial space to enable maintenance of an opposite counterbalancing force, and fairly complex structural interactions which limit overall flexibility of the manipulators. A counterbalanced manipulator is also set forth in U.S. Pat. No. 3,391,804, which issued to C. Flatau on July 9, 1968. This reference teaches the use of a plurality of flat springs wound upon rotatable spools. Such flat springs are unwound by rotational movement of the manipulator arm, whereby an upward force is exerted by such unwound flat springs in order to balance the movement around the rotating shaft. A relatively complex system of movable spools, links, shafts and pins are required, however, to maintain the flat springs in proper position to provide a counterbalancing force.

Consequently, despite all of the prior work undertaken in the industry in an effort to attempt to reduce the load bearing on a motor or other torque producing device in rotatable arm assemblies and the like, there remain problems of providing a dependable load reducing device which minimizes the cost, space requirements, and interference with other parts and operations of the robotic manipulator. With prior art devices, it was necessary to incorporate cumbersome hydraulic or pneumatic devices, or utilize tension springs which also require substantial space and have a relatively limited useful life.

DISCLOSURE OF THE INVENTION

It is an object of this invention to obviate the above-described problems.

It is another object of the present invention to provide a counterbalance assembly for use with a rotatable arm and the like of a robotic manipulator in a relatively inexpensive and space minimizing manner.

It is yet another object of the present invention to provide a counterbalance assembly for use with a rotatable robotic arm comprising a compression spring means and means to convert the rotational movement of the rotatable arm into linear deflection of such compression spring means.

In accordance with one aspect of the present invention, there is provided a counterbalance assembly for use with a rotatable arm and the like in a robotic manipulator, wherein such arm is rotated about a rotation axis by a torque producing motor or similar means. The assembly further includes compression spring means for providing resistance to compressive forces, and converting means for translating the rotational movement of the rotatable arm into linear deflection of such compression spring means, whereby resistance of the compression spring means to linear deflection establishes an effective counterbalancing force which reduces the load bearing on the torque producing motor at the rotation axis.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
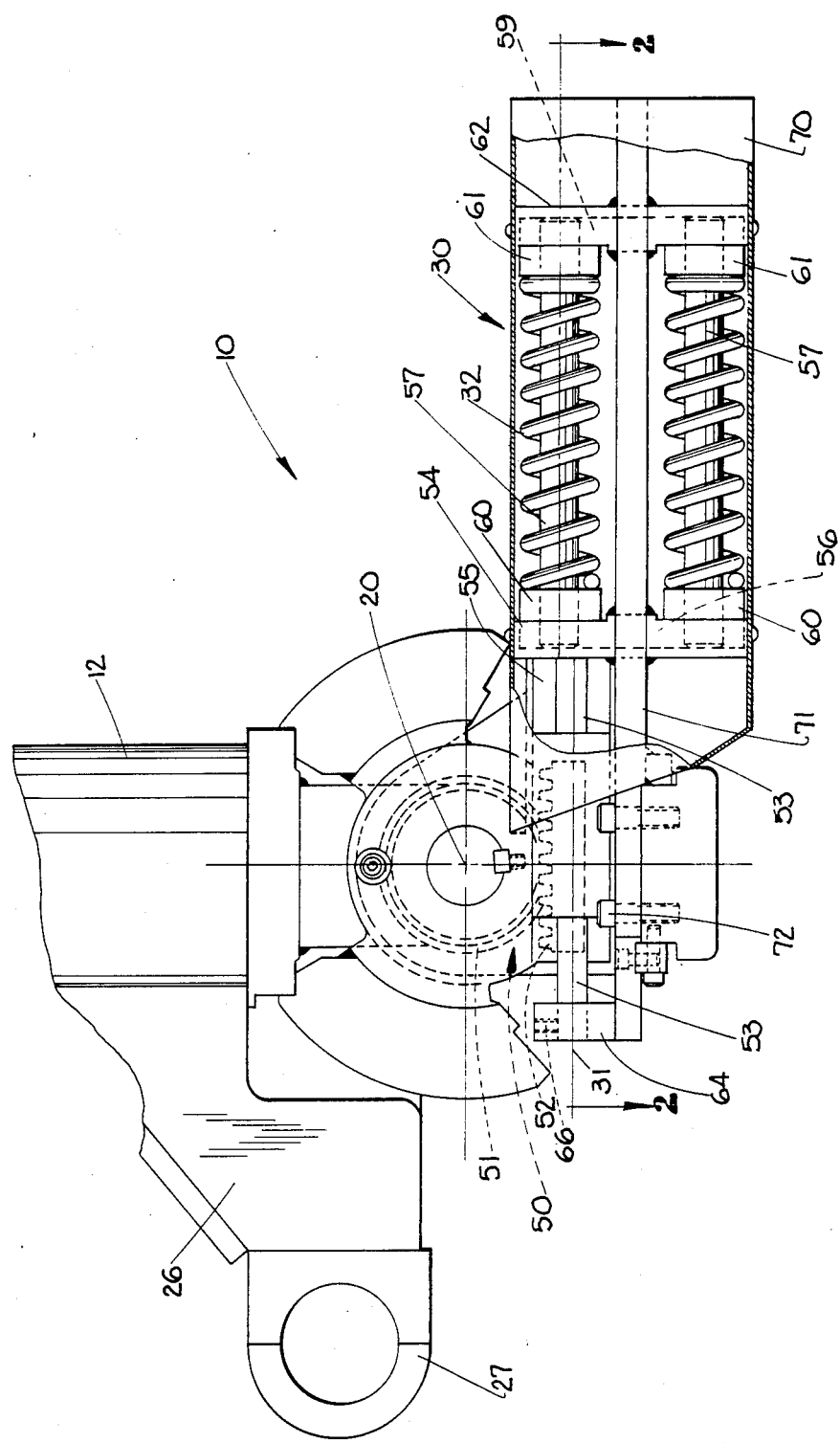
FIG. 1 is a fragmentary, partially broken away, front elevational view of a counterbalance assembly made in accordance with the subject invention.

Referring now to the drawings in detail, wherein like numerals indicate the same elements throughout the views, there is illustrated a preferred embodiment of a counterbalance assembly of the present invention. Counterbalance assembly 10 is shown in FIG. 1 as it might be used in conjunction with rotatable arm 12 of a robotic manipulator (the robotic manipulator not being shown in FIGS. 1–4). It is contemplated that rotatable arm 12 might be a supporting arm for a large movable piece of the robotic manipulator, or may be a movable robotic arm having a payload or similar working piece (e.g. a remote welder or spray gun, or the like) at its distal end. It is contemplated that robotic arm 12 is to be rotated about rotation axis 20 (which extends horizontally into the assembly 10 as shown in FIG. 1) by a torque producing means (not shown). In this regard, robotic arm 12 might be connected by a torque link assembly 26 to a bearing block 27 to be connected to a common ball screw arrangement (such as shown at 28 of FIG. 5). The manner in which robotic arm 12 is rotated, however, is not critical, and the structure illustrated herein is shown only as an example of a preferred mode.

Extending somewhat laterally from the longitudinal axis of robotic arm 12 in FIG. 1 is compression spring means 30 (shown with its outer cover 70 partially broken away for clarity). It is contemplated that the term "compression spring means", as used herein, connotes any structure or assembly which provides resistance to compressive forces in response to linear deflection imposed thereon. In particular, it is contemplated that compression spring means 30 will further comprise at least one compression resistant element, such as the compression springs 32 shown in the figures. Compression spring means 30 is to include a longitudinal axis 31 along which linear compressive forces shall be imposed as a result of rotational movement of robotic arm 12. In this regard, there is further provided a converting means 50 for translating rotational movement of rotatable arm 12 into linear deflection of compression spring means 30.

Converting means 50 can include any structure or combination of structures which can convert the rotational movement of robotic arm 12 about rotation axis 20 into linear movement parallel to longitudinal axis 31. FIGS. 1–4 illustrate a preferred embodiment of converting means 50 wherein such conversion of rotational movement into linear movement is accomplished by the interaction of a pinion 51 rotatably mounted at the proximal end of robotic arm 12 on rotational axis 20, and the slidable rack 52. In particular, pinion 51 includes gear teeth formed about its outer periphery and designed to correspondingly interact with similar teeth formed on the upper portions of rack 52. Rack 52 is slidably mounted on a pair of spaced rack guides 53 which are anchored at their opposite ends by guide anchors 64 and 54, respectively.

Figure 2:
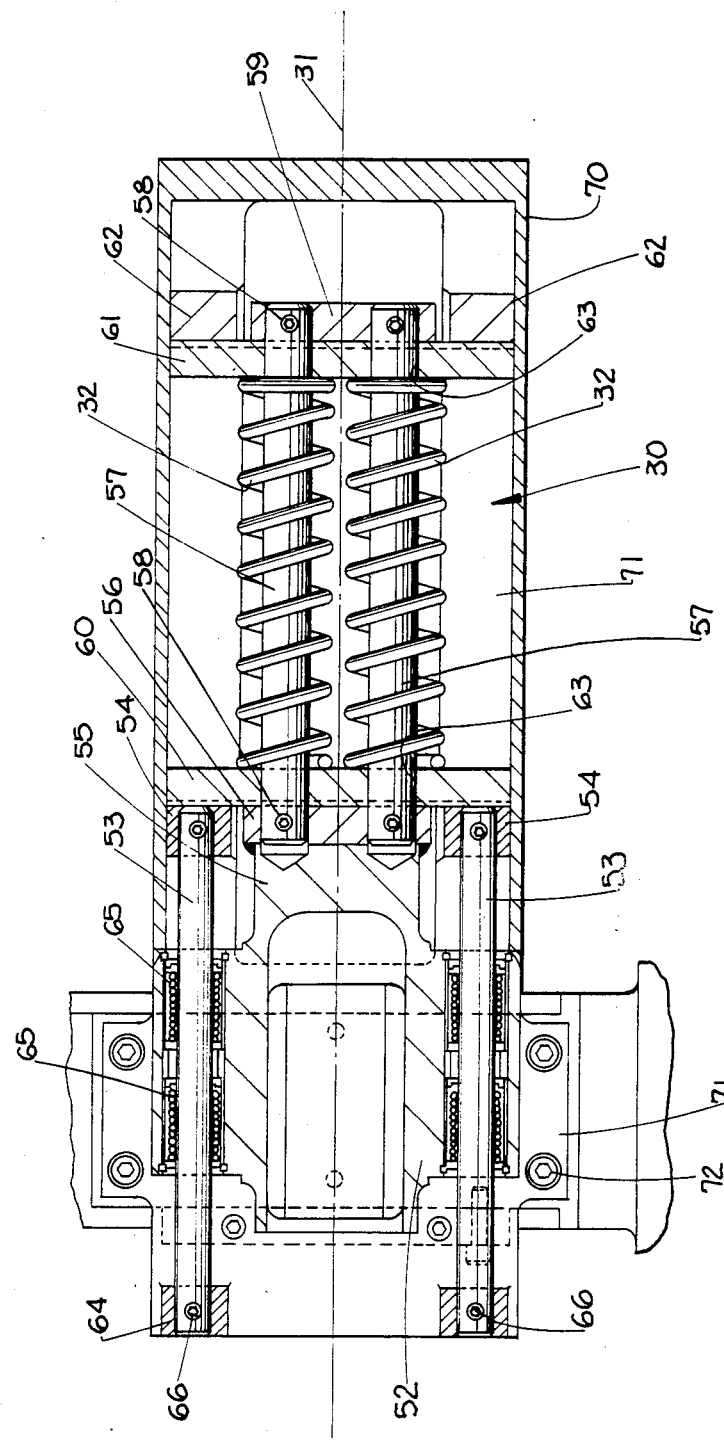
FIG. 2 is a cross-sectional view of the counterbalance assembly of FIG. 1, taken along line 2—2 thereof looking downwardly on part of the converting means and the compression spring means thereof.

As best seen in FIG. 2, rack 52 is designed for reciprocating along the rack guides 53 in response to linear movement imposed by the interacting teeth of pinion 51 and rack 52. It is contemplated that to facilitate movement of rack 52 along rack guides 53, rack 52 may be mounted on such guides by bearings 65. It is contemplated that rack guides 53 could most simply be cylindrical rods anchored at their opposite ends to guide anchors 64 and 54 in any convenient manner (e.g. via set screws 66). Attached on the side of rack 52 nearest compression spring means 30 is a compression transfer link 55 which is, in turn, attached at its distal edge to one or more guide pins 57. It is contemplated that guide pins 57 will pass through the compression spring (or other compression resistant structure) 32 within compression spring means 30. Also attached at the distal end of transfer link 55 is pressure distribution plate 56. Pressure distribution plate 56 serves to connect all of the guide pins 57 to the distal end of transfer link 55. While there may be only one guide pin 57 (in applications where only a single compression resistant structure 32 is utilized), in applications where a plurality of compression resistance structures 32 are utilized, compression distribution plate 56 provides a means for insuring that each of the guide pins required therein will be anchored to transfer link 55 for linear movement therewith.

FIGS. 1 through 4 illustrate the use of four compression springs 32, and distribution plate 56 therefore connects four guide pins 57 to transfer link 55. Guidepins 57 can be attached to distribution plate 56 in any convenient manner, such as by a threaded connection, a set screw, slot and key arrangement, or the like. As shown in FIGS. 1 and 2, guide pins 57 pass through a pair of compression plates 60 above and below mounting chasis or support arm 71. Each compression plate 60 is formed with a plurality of bores 63 corresponding to guide pins 57 and appropriately sized to permit substantially non-interfering passage of guide pins 57 therethrough. As will be seen, compression plates 60 will serve to impose compressive forces on the compression springs 32 in use. As mentioned, it is preferred that a plurality of compressive springs 32 be utilized in order to provide a predetermined amount of resistance to linear compression within counterbalance assembly 10. One spring is to be mounted over each guide pin 57, with such springs being held on such guide pins between compression plates 60 and a pair of corresponding, spaced compression plates 61. Each compression plate 61 similarly includes a plurality of bores 63 to permit passage therethrough of guide pins 57, and the guide pins are similarly anchored at their distal ends to a second distribution plate 59 located on the far side of compression plates 61. A set (preferably four) of compression plate anchors 62 are also included to provide a mooring place for compression plates 61. As a result, compression springs 32 are held on their individual guide pins 57 between the spaced compression plates 60 and 61, respectively, and between the spaced anchors 54 and 62, respectively. Anchors 54 and 62 can be attached to a support arm (e.g. 71) and are to be located such that they do not interfere with linear movement of distribution plates 56 or 59, but serve to limit the linear movement of compression plates 60 and 61, respectively. It is contemplated that support arm 71 would be located below rack 52 and substantially parallel to axis 31 (as shown in FIG. 1), and have one or more slots formed therein to permit substantially unfettered movement of distribution plates 56 and 59.

Support arm 71 is illustrated as being anchored to the robotic manipulator by a plurality of screws 72.

It is contemplated that compression springs 32 can comprise relatively standard die springs as commonly available in the industry (e.g. as available from Danly Machine Corp., Chicago, Illinois). The exact number and size of such springs can vary depending upon the counterbalance forces desired, the size of the robotic arm involved, etc. The entire compression spring means 30 is illustrated in the figures as also including an outer cover 70. Depending upon location of the counterbalance assembly 10 within a robotic manipulator, such an outer cover may not be required. For example, it is contemplated that counterbalance assembly 10 might preferably be located within a hollow part of the robotic manipulator such as the hollow base thereof, or even a hollow portion of the robotic arm 12 itself.

Figure 3:
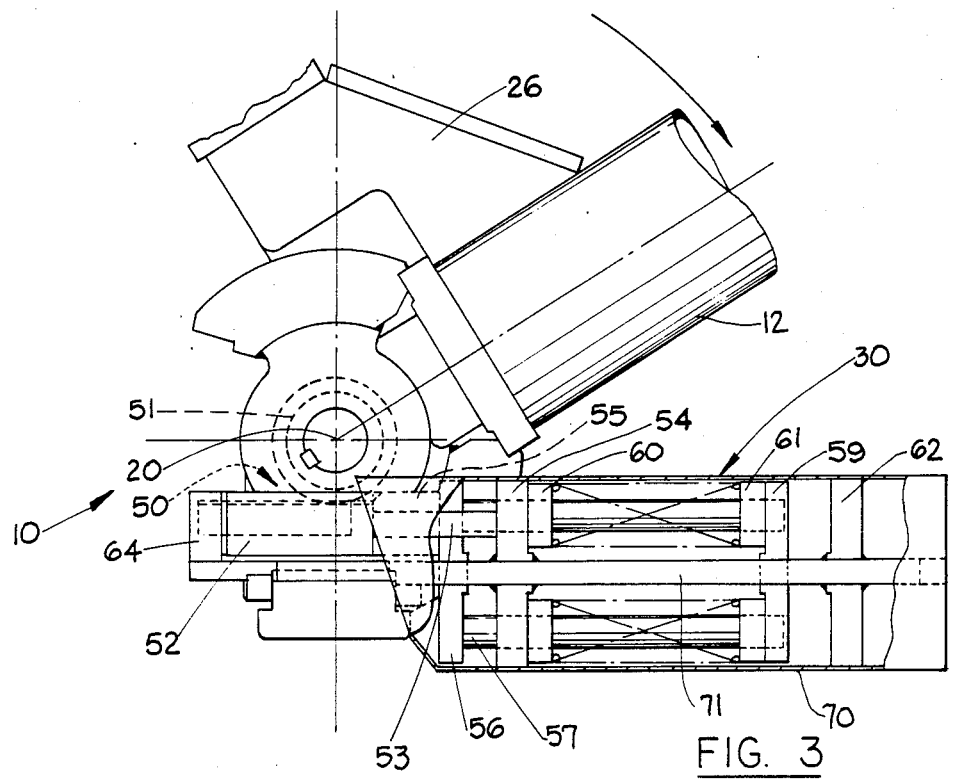
FIG. 3 shows the counterbalance assembly of FIG. 1, shown with the rotatable arm rotated in a clockwise direction from that shown in FIG. 1.
Figure 4:
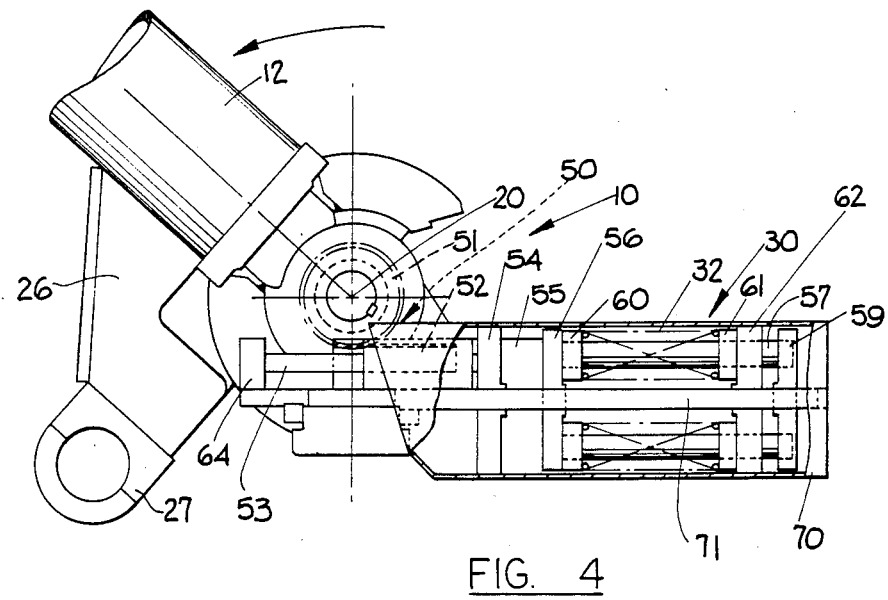
FIG. 4 shows the counterbalance assembly of FIG. 1, shown after rotation of the rotatable arm in a counterclockwise direction relative its position in FIG. 1.

The function of the particular counterbalance assembly 10 shown in the drawing is best understood from FIGS. 2-4. FIG. 2 illustrates counterbalance assembly 10 as it would appear when robotic arm 12 is in substantially vertical condition (as shown in FIG. 1). In this position, it is contemplated that compression springs 32 will be in their least compressed condition, as no counterbalancing force is required when robotic arm 12 is in such a completely vertical condition. It should be noted, however, that compression spring means 30 might desirably be pre-loaded such that its compression springs 32 would be slightly compressed even when no counter-balancing forces were required. This might be desirable to provide a self-centering function to the counter-balance assembly 10, wherein counterbalancing forces tend to force robotic arm 12 to return to its non-rotated or centered position. Such preloading could be accomplished quite simply by designing the location of anchors 54 and 62 to provide a space between the compression plates 60 and 61 which is slightly less than the uncompressed longitudinal length of compression springs 32. This could also be accomplished by inserting a shim of predetermined thickness between compression plates 60 and/or 61 and their corresponding distribution plates 56 and/or 59, respectively. These procedures would necessitate that compression springs 32 be slightly compressed in order to be mounted over their guide pins 57 between compression plates 60 and 61. Such preloaded compression would augment the tendency of counterbalance assembly 10 to force robotic arm toward its vertically aligned position, thereby providing an automatic centering mechanism for such arm.

While FIGS. 1 and 2 illustrate robotic arm 12 in a substantially vertical condition, FIGS. 3 and 4 have been included to illustrate the counterbalancing function of the invention when a robotic arm (e.g. 12) is rotated from such vertical condition. In particular, in FIG. 3 robotic arm 12 has been rotated clockwise approximately 50°. It can be seen by a comparison of FIGS. 1 and 3, that such rotation has caused rack 52 to be shifted to the left thereby moving transfer link 55 in the same direction. Transfer link 55, in turn, pulls distribution plate 56 toward the left, bringing with it guide pins 57 and, thereby, linearly displacing distribution plate 59 toward the left. Because anchors 54 do not allow compression plates 60 to move to the left, compression plates 60 prevent the left end of compression springs 32 from being displaced. Similarly, because distribution plate 59 is being displaced, it similarly displaces compression plates 61 thereby compressing the compression springs 32 in proportion to the linear deflection of distribution plate 59. Due to the characteristic of die springs to resist linear compression in a manner which is substantially proportional to the linear deflection imposed thereon, the further the rotation of robotic arm 12 in a clockwise direction, the more the resistance created by compression of the springs 32. The resistance of compression springs 32 to linear deflection establishes an effective counterbalancing force which is transferred through the counterbalance assembly 10 to robotic arm 12, thereby reducing the load bearing on the torque producing motor at rotation axis 20. Moreover, the counterbalancing force provided by counterbalance assembly 10 is substantially proportional to the degree of rotation of robotic arm 12 about its rotation axis 20. While the proportional nature of the counterbalancing force is not critical, it may be preferred in some applications. Where non-linear counterbalancing forces are desired, simple substitution of compression spring means having non-linear resistance to compressive forces might be utilized; or in the alternative, several die springs as described herein could be designed to function in a selective manner to increase or decrease resistance appropriately.

A comparison of FIG. 4 with FIG. 1 illustrates how converting means 50 transforms the rotational movement of robotic arm 12 about rotation axis 20 in a counterclockwise direction into linear displacement within compression spring means 30 toward the right thereof. In particular, counterclockwise movement of robotic arm 12 results in linear movement of rack 52 to the right, thereby similarly deflecting transfer link 55 to the right. Transfer link 55 correspondingly displaces distribution plate 56 in that same direction causing compression plates 60 to compress the compression springs 32 in that same linear direction. Anchors 62 prevent displacement to the right of compression plates 61, thereby preventing the ends of compression springs 32 in contact with compression plates 61 from being displaced. Again, due to the nature of the die springs as described, the amount of resistance to linear compression of springs 32 is substantially proportional to the linear deflection imposed thereon, such that the effective counterbalancing force created by compression springs 32 linearly increases with each increment of rotation of robotic arm 12. The counterbalancing force minimizes the torque required to maintain the rotated robotic arm at any given position, thereby reducing torque input requirements.

As mentioned above, the choice of compression spring means 30 and the number of individual compression resistant spring structures required for any particular application may vary widely. In this regard, in a particular application, one would design the counterbalance assembly 10 in order to provide a predetermined amount of counterbalancing force as required. For instance, if one knew that a counterbalancing force of 20,000 inch pounds would be required to offset the torque required to maintain a robotic arm at a position rotated 55° from the vertical, the particularly desired converting means 50 would first have to be determined. While a rack and pinion arrangement is shown and described herein, other arrangements such as a sprocket and chain, toggle assemblies, cable arrangements, or the like could equally be utilized. If the rack and pinion arrangement were desired, a pinion diameter would be chosen to match the amount of space available in a particular application and the relative counterbalancing forces required. If a pinion having a diameter of approximately 4 inches was utilized, the 20,000 inch pounds of counterbalance torque required would be achieved through the two inch radius of such pinion, so the compression spring means would have to deliver 10,000 inch pounds of force when the robotic arm had traveled 55°. By calculating the linear deflection which would result from rotation of the 4 inch diameter pinion through 55°, standard compression springs could be chosen to provide the 10,000 inch pounds of force at the known linear deflection value. In this regard, one spring or a plurality of springs could be chosen to provide the required force. As can be seen from the description above, the counterbalance assembly of the current invention provides counterbalancing regardless of the direction in which robotic arm 12 is rotated. Advantages of such a dual direction compression spring means are found not only in the reduction of costs and complexity, but also in the reduction of space requirements for a counterbalancing system.

Figure 5:
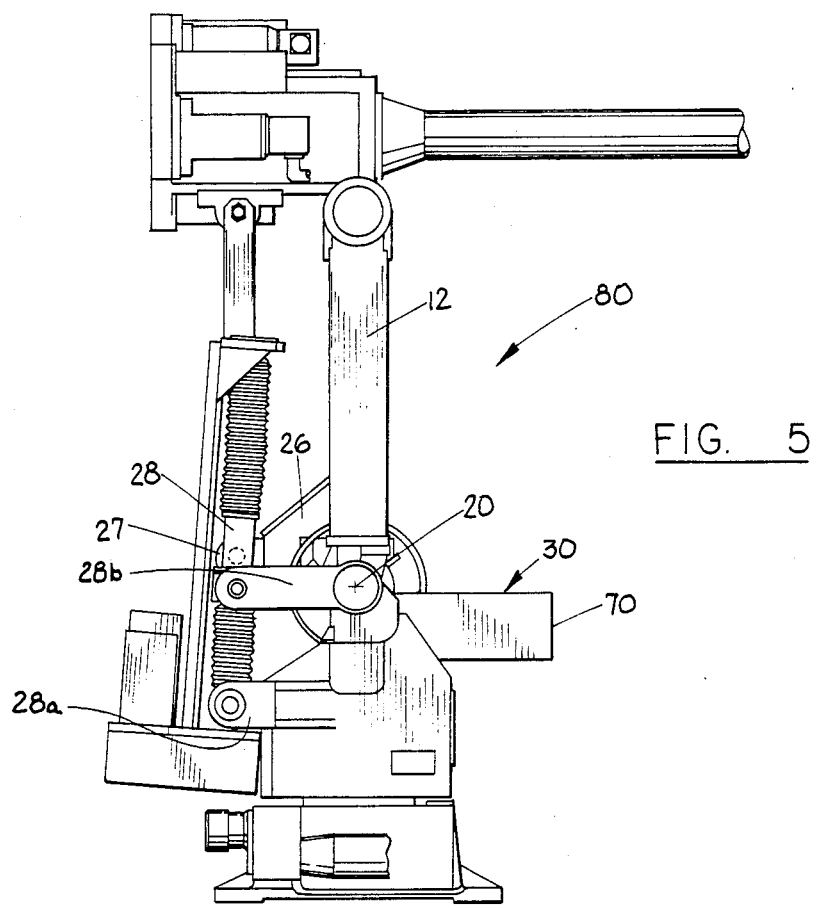
FIG. 5 is a front elevational view of an example of a robotic manipulator incorporating the counterbalance assembly of the subject invention.

Additionally, it is contemplated that the counterbalance assembly of the subject invention could quite easily be incorporated within a hollow structure of a robotic manipulator, thereby substantially reducing and, possibly, eliminating a need for utilizing any space other than that already available in any particular robotic manipulator in order to incorporate subject device. For example, as mentioned above, the compression spring means 30 of the subject counterbalance assembly might be located within a hollow portion of the robotic arm to which the counterbalancing force is to be applied. In this reagard, while FIG. 5 illustrates a counterbalance assembly as described herein mounted on a robotic manipulator 80, having its compression spring means 30 extending somewhat from the normal contours of such manipulator; it is contemplated that compression spring means 30 might equally be situated within the hollow interior of robotic arm 12 such that the counterbalance assembly would be virtually undetectable from outside the robot. FIG. 5 illustrates the incorporation of a counterbalance assembly 10 as shown in FIGS. 1 through 4 wherein the torque link assembly 26 is attached to a ball screw arrangement 28 by bearing block 27. Ballscrew arrangement 28 is shown as being mounted on manipulator 80 in a standard fashion by link arms 28a and 28b, respectively. Ball screw arrangement 28 thereby provides rotational torque to robotic arm 12 at the rotation axis 20, and counterbalance assembly 10 establishes an effective counterbalancing force which reduces the load bearing on ball screw arrangement 28 at rotation axis 20 when robotic arm 12 is rotated in either a clockwise or counterclockwise direction.

While compression spring means 30 has been described herein as including one or more compression springs, it is contemplated that any structure which can be compressed and which exhibits resistance to linear compression along a longitudinal axis thereof could also be utilized. In particular, a plug or similar unit of rubber or other resiliant material could be used, as well as a hydraulic or pneumatic pressurized cyclinder which could be loaded from either direction along a longitudinal axis. However, it is preferred that compression springs be utilized to minimize the costs of such structure and the complexity of arranging it within the counterbalance assembly for compression in either direction.

Having shown and described the preferred embodiment of the present invention, further adaptions of the counterbalance assembly can be accomplished by appropriate modification by one of ordinary skill in the art without departing from the scope of the present invention. Several alternatives and modifications have been described herein, and others will be apparent to those skilled in the art. Accordingly, the scope of the present invention should be considered in terms of the following claims and is understood not to be limited to the details of the methods and structures shown and described in the specification and drawings.

We claim:

1. A counterbalance assembly for use with a rotatable arm and the like in a robotic manipulator, wherein such arm is rotated about a rotation axis by a torque producing device or similar means, said assembly comprising:
    (a) compression spring means for providing resistance to compressive forces in response to linear deflection imposed thereon from either direction along a longitudinal axis of said compression spring means; and
    (b) converting means for translating rotational movement of a rotatable arm of said robotic manipulator about said rotation axis into linear deflection of said compression spring means, whereby resistance of said compression spring means to linear deflection from said converting means in either direction along said longitudinal axis establishes an effective counterbalancing force which reduces the load bearing on the torque producing device at the rotation axis regardless of the direction in which the rotatable arm is rotated.

2. The counterbalance assembly of claim 1, wherein said longitudinal axis of said compression spring means is oriented substantially parallel to the line along which said linear deflection is imposed thereon, said compression spring means capable of equally resisting such compressive forces from either end along its longitudinal axis.

3. The counterbalance assembly of claim 1, wherein said compression spring means provides resistance to compressive forces which is substantially proportional to linear deflection imposed thereon.

4. The counterbalance assembly of claim 2, said assembly further comprising centering means for constantly tending to automatically return the rotatable arm to its unrotated position.

5. The counterbalance assembly of claim 1, wherein said means for converting rotational movement of the rotatable arm into linear deflection further comprises a rack and pinion arrangement, said pinion interacting with said rack to translate rotation of said arm about said rotation axis into linear movement of said rack.

6. The counterbalance assembly of claims 3, 4, or 5, wherein said compression spring means further comprises one or more linear transfer links for transferring said linear deflection from said converting means to deflection means for imposing linear deflection on said compression spring means, said deflection means being capable of providing compressive forces to said compression spring means from either end along its longitudinal axis depending on the direction of said linear deflection parallel to said longitudinal axis.

7. The counterbalance assembly of claim 6, wherein said compression spring means comprises one or more compression springs.

8. The counterbalance assembly of claim 6, wherein the counterbalance force established by said assembly is substantially equal to the load bearing on the torque producing device at the rotation axis for any given position of said arm.

9. The counterbalance assembly of claim 1, wherein said compression spring means is preloaded such that the counterbalance force established by said assembly is normally greater than the load bearing on the torque producing device at the rotation axis for any given position of said arm.

10. A counterbalance assembly for use with a rotatable arm and the like in a robotic manipulator, wherein such arm is rotated about a rotation axis by a torque producing device or similar means, said assembly comprising:
   (a) compression spring means for providing resistance to compressive forces, said spring means having a longitudinal axis, and said resistance being substantially proportional to linear deflection of said spring means by said compressive forces from either direction along said longitudinal axis; and
   (b) converting means for translating rotational movement of the rotatable arm about its rotation axis into linear deflection of said compression spring means along said longitudinal axis, whereby resistance of said compression spring means to linear deflection in either direction along said longitudinal axis establishes an effective counterbalancing force which reduces the load bearing on the torque producing device at the rotation axis regardless of the direction in which the rotatable arm is rotated.

11. The counterbalance assembly of claim 10, said assembly further comprising centering means for constantly tending to automatically return the rotatable arm to its unrotated position.

12. The counterbalance assembly of claim 10, wherein said means for converting rotational movement of the rotatable arm into linear deflection further comprises a rack and pinion arrangement, said pinion interacting with said rack to translate rotation of said arm about said rotation axis into linear movement of said rack.

13. The counterbalance assembly of claims 11 or 12, wherein said compression spring means further comprises one or more linear transfer links which transfer said linear deflection from said converting means to deflection means for imposing linear deflection on said compression spring means, said deflection means being capable of providing compressive force to said compression spring means from either end along its longitudinal axis depending upon the direction of said linear deflection parallel to said longitudinal axis.

14. The counterbalance assembly of claim 13, wherein said compression spring means comprises one or more compression springs.

15. The counterbalance of claim 13, wherein the counterbalance force established by said assembly is substantially equal to the load bearing on the torque producing device at the rotation axis for any given position of said arm.

16. A counterbalance assembly for use with a rotatable arm and the like in a robotic manipulator, wherein such arm is rotated about a rotation axis by a torque producing device or similar means, said assembly comprising:
   (a) compression spring means for providing resistance to compressive forces, said spring means further comprising a plurality of compression springs having substantially parallel longitudinal axes, said compression springs providing said resistance to compressive forces, and said resistance being substantially proportional to linear deflection of such springs by said compressive forces from either direction along said longitudinal axes;
   (b) converting means for translating rotational movement of the rotatable arm about its rotation axis into linear movement, and
   (c) one or more linear transfer links which transfer said linear movement from said converting means to said compression springs, whereby said linear movement causes linear deflection of said springs along their longitudinal axes, and resistance of said springs to linear deflection from either direction along said longitudinal axes establishes an effective counterbalancing force which reduces the load bearing on the torque producing device at the rotation axis regardless of the direction in which the rotatable arm is rotated.

17. The counterbalance assembly of claim 16, wherein said linear transfer link further comprises a pair of spaced distribution plates which are located at opposite ends of said springs and reciprocated in a direction substantially parallel to the longitudinal axes of said compression springs, and wherein said distribution plates impose compressive force on said compression springs by means of a pair of spaced compression plates, one of said compression plates corresponding to each of said spaced distribution plates, whereby said plates are designed for alternate engagement by its corresponding distribution plate during reciprocation.

* * * * *

UNITED STATES PATENT AND TRADEMARK OFFICE
CERTIFICATE OF CORRECTION

PATENT NO. : 4,756,204
DATED : July 12, 1988
INVENTOR(S) : Christoph F. Wittwer and David E. Suica It is certified that error appears in the above—identified patent and that said Letters Patent is hereby corrected as shown below:

In column 7, line 8, the word "force" has been deleted and replaced with the word --torque--.

In column 7, line 9, the words "offset the" have been deleted.

In column 7, line 10, the words "torque required to" have been deleted.

In column 7, line 25, the word "inch" has been deleted.

In column 7, line 29, the word "inch" has been deleted.

In column 7, line 51, the word "reagard" has been deleted and replaced with the word --regard--.

In column 8, line 10, the word "resiliant" has been deleted and replaced with the word --resilient--.

Signed and Sealed this

Twentieth Day of December, 1988

*Attest:*

DONALD J. QUIGG

*Attesting Officer*     *Commissioner of Patents and Trademarks*